United States Patent
Drobe et al.

(10) Patent No.: US 7,971,996 B2
(45) Date of Patent: Jul. 5, 2011

(54) MULTI-TINT COLORED OPHTHALMIC LENSES FOR THE SHORT-SIGHTED

(75) Inventors: Bjorn Drobe, Charenton le Pont (FR); Guillaume Giraudet, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 21 days.

(21) Appl. No.: 12/514,568

(22) PCT Filed: Nov. 15, 2007

(86) PCT No.: PCT/FR2007/052347
§ 371 (c)(1),
(2), (4) Date: Dec. 11, 2009

(87) PCT Pub. No.: WO2008/059178
PCT Pub. Date: May 22, 2008

(65) Prior Publication Data
US 2010/0091240 A1 Apr. 15, 2010

(30) Foreign Application Priority Data
Nov. 17, 2006 (FR) ..................... 06 10098

(51) Int. Cl.
*G02C 7/10* (2006.01)
(52) U.S. Cl. ....................... 351/165; 351/159

(58) Field of Classification Search .......... 351/164–165, 351/159, 177
See application file for complete search history.

(56) References Cited

U.S. PATENT DOCUMENTS

| 3,454,332 | A | * | 7/1969 | Siegel ........................... 351/162 |
| 3,628,854 | A | * | 12/1971 | Jampolsky .................... 351/175 |
| 5,408,278 | A | | 4/1995 | Christman |
| 5,528,322 | A | | 6/1996 | Jinkerson |
| 6,811,258 | B1 | | 11/2004 | Grant |
| 6,827,440 | B2 | | 12/2004 | Ocampo |
| 2006/0092374 | A1 | | 5/2006 | Ishak |
| 2006/0238703 | A1 | * | 10/2006 | Ramos ......................... 351/163 |
| 2010/0060850 | A1 | | 3/2010 | Giraudet |
| 2010/0091240 | A1 | | 4/2010 | Drobe et al. |
| 2010/0103371 | A1 | * | 4/2010 | Sarver et al. .................. 351/165 |

FOREIGN PATENT DOCUMENTS

| FR | 1179188 | 5/1959 |
| FR | 2389912 | 12/1978 |
| FR | 2418478 | 9/1979 |
| WO | WO97/31286 | 8/1997 |

* cited by examiner

*Primary Examiner* — Joseph Martinez
*Assistant Examiner* — James R Greece
(74) *Attorney, Agent, or Firm* — Occhiuti Rohlicek & Tsao LLP

(57) ABSTRACT

The present invention relates to an ophthalmic lens, having, on its surface, a colorless or yellow, central first zone and at least one peripheral second zone, selectively transmitting visible light having a wavelength of less than 570 nm.

7 Claims, No Drawings

MULTI-TINT COLORED OPHTHALMIC LENSES FOR THE SHORT-SIGHTED

CROSS-REFERENCE TO RELATED APPLICATIONS

This application is the National Stage of International Application No. PCT/FR2007/052347, filed on Nov. 15, 2007, which claims the priority of French Application No. 0610098, filed on Nov. 17, 2006, the contents of both applications are hereby incorporated by reference in their entirety.

The present invention relates to novel multicolored ophthalmic lenses intended for the treatment of progressive myopia.

It is generally acknowledged that the causes of myopia are both genetic and acquired.

For reasons which are still poorly understood, the emmetropization process which normally tends to eliminate any refractive errors present at birth, does not function correctly in short-sighted individuals. This malfunction then leads to excessive growth of the eye in the axial direction.

Research carried out on animals has shown that emmetropization is an active process which occurs as a reaction to visual stimuli received by the eye. Numerous works strongly suggest that optical defocusing could play an important role in this process. Until now, strategies for treating myopia attempting to slow down the progression of myopia by acting on focusing have been concentrated, with relatively little success, on central focusing, in other words on focusing the retinal image on the fovea, the central zone situated in the longitudinal axis of the eye.

Smith et al. have recently reported in their international application WO2005/055891 that peripheral defocusing, i.e. defective focusing of the retinal image in the zone surrounding the fovea, could play a role in the genesis and development of myopia and that a targeted correction at this zone could effectively slow down the progression of myopia. The technical solution proposed in this application involves providing in known manner an appropriate optical correction in terms of central vision guaranteeing the patient good visual acuity, but adjusting the peripheral correction so as to obtain peripheral focusing at points situated slightly in front of the retina.

Such a differential correction is however very complex to implement. Moreover, this correction, to be effective, requires an implementation which guarantees a good coaxiality of the eye and the corrective device. The corrective devices recommended in the international application WO2005/055891 are orthokeratology, corneal surgery, corneal implants, contact lenses and intraocular lenses. Although this document also envisages spectacles as corrective devices, these manifestly constitute an embodiment less well-suited to the purpose of the invention. In fact, when the eye moves behind the lenses of spectacles, the coaxiality of the eye and the corrective device is broken and the central vision is thereby disturbed.

Therefore a need still exists for a corrective device intended to slow down the progression of myopia, allowing both good visual acuity in terms of central vision and peripheral focusing on the peripheral retina or in front of the latter, but contributing less to a perfect alignment of its axis with that of the ocular axis.

In order to develop such a device, the applicant has taken advantage of the well-known phenomenon of chromatic aberration. Chromatic aberration is the variation of the refractive index of the material making up a lens as a function of the wavelength of the light which passes through it. This results in a focal length which varies as a function of the wavelength (a phenomenon also called longitudinal chromatic aberration): the greater the wavelength, the further the focusing point is from the lens.

The emmetropization of the eye generally ends in an axial length of the crystalline lens such that the focusing point of the yellow light, in terms of central vision, is situated essentially on the retina, whereas the focusing of the red component of the light takes place behind the retina and that of the blue light slightly in front of the retina. In other words the focusing plane of the yellow light (570-590 nm) cuts the retina substantially at the fovea, the focusing planes of the light having wavelengths greater than 590 nm are located behind the retina and have no point of intersection with the latter, and the focusing planes of wavelengths less than 570 nm are located in front of the retina and cut the latter into concentric circular zones which are the further from the fovea, the shorter the wavelength of the light.

The idea forming the basis for the present invention is to reduce so far as possible the zone of the retina affected by optical defocusing by selectively filtering the light as a function of its wavelength so as to allow the penetration into the eye, at a given point of the retina, only of light the focusing plane of which cuts the retina at this point. In other words:
 the fovea will receive yellow light,
 a first annular zone directly adjacent to the fovea will receive only light having a wavelength slightly less than that of yellow light, then,
 a second annular zone directly adjacent to the first annular zone will receive only light having a still shorter wavelength and so on,
the shorter the wavelength of the light penetrating into the eye is, the further the peripheral zone, where it will touch the retina, will be from the central axis of the eye passing through the fovea.

This selective filtration of the light as a function of the angle of penetration of the latter into the eye is obtained fairly simply by coloured concentric annular zones on a corrective ophthalmic lens adapted to the myopia of the patient.

A subject of the present invention is therefore a corrective ophthalmic lens comprising, on its surface, a first colourless or yellow-coloured central zone, i.e. selectively transmitting visible light with a wavelength comprised between 570 nm and 590 nm, as well as at least one peripheral second zone, selectively allowing light having a wavelength less than 570 nm to pass through.

A subject of the invention is also the use of such an ophthalmic lens for producing spectacles intended to slow down or stop the advance of progressive myopia.

Finally, a subject of the invention is a method for treating progressive myopia comprising the prescription, for a patient suffering from progressive myopia, of spectacles comprising at least one such ophthalmic lens.

The corrective lens of the present invention is a lens for the short-sighted, i.e. preferably a concave monofocal ophthalmic lens, with a negative diopter comprised between −0.25 and −10.00.

The adjective "central" used to describe the yellow-coloured or colourless zone signifies that this zone occupies a position corresponding to the optical centre of the ophthalmic lens according to the invention and is preferably centered around this optical centre. The yellow-coloured or colourless zone thus essentially extends over the zone explored by the view of the wearer of the spectacles.

The colourless or yellow-coloured central zone is preferably circular or oval in shape.

Advantageously, the diameter of the yellow-coloured or colourless circular zone, or the largest dimension of the yellow-coloured or colourless oval zone, is comprised between 5 and 35 mm, preferably between 10 and 20 mm, and is in particular approximately 15 mm.

The dimensions of the colourless or yellow-coloured central zone indicated above correspond to the ranges appropriate for most wearers of spectacles, but does not take account of individual differences, but does not take account of individual differences. It is advantageous to limit the dimension of the yellow-coloured or colourless central zone to that of the zone actually explored by the human eye. Such an optimization of the relative dimensions of the central and peripheral zones can be carried out for example using the Vision Print System technology (VPS) developed by the applicant within the context of other research into visual behavior. This involves a device making it possible to describe the interindividual differences in eye-head coordination strategy in the visual exploration of the environment, also called "eye-head behaviour". It is thus possible to define, individuals who are "head movers" having a tendency to follow an object visually by a movement of the head rather than by a movement of the eye, and, on the other hand, individuals who are "eye movers" having a tendency to follow an object visually by a movement of the eyes rather than with the head.

Determination of the eye-head behavior of a wearer of spectacles, thus makes it possible to optimize the size of the colourless or yellow-coloured central zone. If the wearer has a tendency to turn their head rather than their eyes to follow an object by sight, a central zone of 5 to 15 mm, is generally sufficient to cover the whole vision zone of the lens. Conversely, if the wearer has a tendency to move their eyes rather than their head to follow an object by sight, then a yellow or colourless central zone covering a relatively wide zone of the lens is necessary, for example a zone having a diameter comprised between 15 to 35 mm.

The colourless or yellow-coloured central zone is surrounded by at least one peripheral zone, preferably several peripheral zones, selectively transmitting light having a wavelength less than 570 nm.

These zones are annular in shape and are preferably concentric, one in relation to the other or several in relation to each other. Their centre of symmetry is preferably superimposed on the optical centre of the lens.

The peripheral zone preferably comprises at least two zones of different colours, still more preferentially three, four or five zones of different colours. In fact, the greater the number of zones of different colours, the finer will be the adjustment of the wavelength of the light transmitted as a function of the decentring angle with respect to the central axis, and the larger the extent of the peripheral zone of the retina receiving a clear image, i.e. focused on the latter. The number of annular zones of different colours is in practice limited only by the complexity of the method of colouration of the lens.

The peripheral zone is thus preferably formed by a multitude of concentric annular zones, of different colours. Each of these annular zones selectively transmits visible light with a wavelength which is the shorter the further the zone is from the central zone. Thus, the annular zone directly adjacent to the central zone, preferably selectively transmits light having a wavelength slightly less than 570 nm, for example comprised between 570 and 550 nm. The next annular zone, situated around the first annular zone, selectively transmits light with a wavelength less than 550 nm, for example comprised between 550 and 530 nm and so on. The ophthalmic lens of the present invention can thus have for example a colourless or yellow central zone, surrounded by a first green-coloured annular zone, a second blue-coloured annular zone and a third violet-coloured annular zone. The different annular zones can have widths which are identical to or different from each other.

The annular zones surrounding the central zone preferably cover all of the visible light spectrum comprised between 570 and 400 nm. The range of wavelengths selectively transmitted by each of the annular zones is preferably all the narrower, the smaller the width of said annular zone.

In a particular embodiment, the peripheral zone comprises an infinity of annular zones each transmitting light of a given wavelength. In this embodiment, the peripheral zone exhibits, from its internal limit to its peripheral limit, the whole of the transmission spectrum of visible light of a wavelength comprised between 570 nm and 400 nm, the wavelength of the light transmitted progressively reducing and preferably linearly from the centre to the periphery of the zone. The peripheral zone will then have the appearance of an incomplete rainbow in the form of a ring sweeping across the visible spectrum from yellow to violet, from the inside to the outside.

The corrective lens for the short-sighted as described above thus makes it possible to substantially reduce the zone of the peripheral retina affected by optical defocusing. However it does not have the drawback of blurred vision when the eye moves behind the lens, which adversely affects the technical solution described in WO2005/055891. In fact, the corrective power of the lens can be adjusted in a known manner and independently of the colour of the surface, in order to guarantee clarity of the image in terms of central vision. When the eye moves behind the lens and the view explores a zone of the lens situated outside the central zone, the eye perceives only a change of colour but the clarity of the image is not disturbed in principle.

The use of the colourations on appropriate supports made of mineral or organic glass with a view to producing an ophthalmic lens according to the invention can be done for example by sublimation and/or by inkjet printing. These techniques are described for example in the applications WO 2006/079564 and FR2881230 in the name of the applicant. It is also possible to envisage the use on a substrate of a pixelated film combined with inkjet printing technology as described in the patent application WO2006/013250.

The present invention will be better understood on reading the following examples which illustrate the subject of the invention in non-limitative manner.

EXAMPLE 1

Coloration of Ophthalmic Lenses According to the Invention by Inkjet Printing

40% by weight of anionic polyurethane (W234 marketed by Baxenden) is mixed under magnetic stirring with 60% by weight of colloidal silica (Ludox TM40 marketed by Aldrich). After stirring for one hour, the mixture obtained by centrifugation (spin coating) is applied to an Orma™ biplane substrate (500 revolutions/20 seconds). The deposit is dried for 1 hour at 100° C. in an oven. The thickness of the primer thus obtained is 3.6 µm. After drying, the optical lens comprising the primer and the substrate can be printed with a Canon i865 printer. A yellow central zone and three successive annular zones coloured green, blue and violet respectively are drawn using Powerpoint™ software. The ophthalmic lens is introduced into the loading module of the printer, the latter being connected to the computer comprising the file "yellow filter—three-colour filter" in Powerpoint™.

The printing is carried out. When the lens leaves the printer, it is immediately dried for 1 hour at 100° C. An ophthalmic lens with a central yellow filter and a three peripheral filters coloured green, blue and violet is obtained.

The invention claimed is:

1. An ophthalmic lens, comprising, on its surface,
   a first colorless or yellow-colored central zone, and
   a second peripheral zone, selectively transmitting visible light having a wavelength of less than 570 nm,
   wherein the peripheral zone is formed by a multitude of concentric annular zones, of different colors, each of the annular zones selectively transmitting visible light having a wavelength which is the shorter, the further the zone is from the central zone.

2. The ophthalmic lens according to claim 1, which is a concave monofocal ophthalmic lens.

3. The ophthalmic lens according to claim 1 wherein the colorless or yellow-colored central zone is circular or oval in shape.

4. The ophthalmic lens according to claim 3, wherein the colorless or yellow-colored central zone is centered on the optical centre of the lens.

5. The ophthalmic lens according to claim 3, wherein the diameter or the largest dimension of the yellow-colored central zone is comprised between 5 and 35 mm.

6. The ophthalmic lens according to claim 1 wherein the peripheral zone exhibits, from its internal limit to its peripheral limit, the whole of the transmission spectrum of visible light of a wavelength comprised between 570 nm and 400 nm, the wavelength of the light transmitted progressively decreasing, preferably linearly, from the centre to the periphery of the zone.

7. Method for treating progressive myopia comprising the prescription, for a patient suffering from progressive myopia, of spectacles comprising at least one ophthalmic lens according to claim 1.

* * * * *